Patented Jan. 2, 1923.

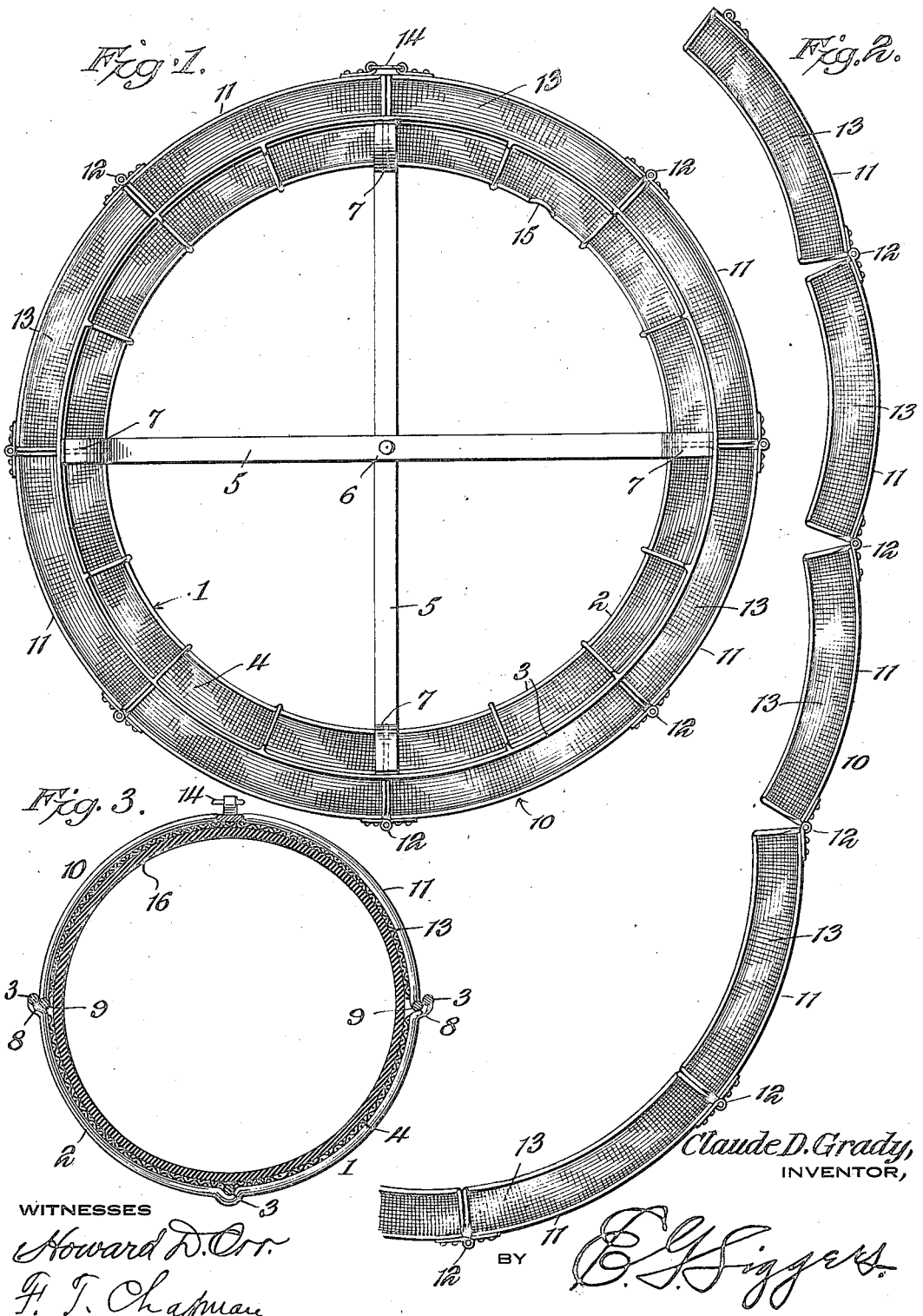

1,441,079

UNITED STATES PATENT OFFICE.

CLAUDE DAVIS GRADY, OF STURGIS, KENTUCKY, ASSIGNOR OF ONE-HALF TO EMMETT E. WALLACE, OF STURGIS, KENTUCKY.

INNER-TUBE-TESTING DEVICE.

Application filed March 24, 1921. Serial No. 455,087.

*To all whom it may concern:*

Be it known that I, CLAUDE D. GRADY, a citizen of the United States, residing at Sturgis, in the county of Union and State of Kentucky, have invented a new and useful Improvement in Inner-Tube-Testing Devices, of which the following is a specification.

This invention has reference to inner tube testing devices for automobile tires, and its object is to provide a tubular shaped structure capable of withstanding internal pressure, such as that to which the inner tube is subjected when in the casing and pumped up, and yet rendering the inner tube visible so that leaks become readily apparent, especially when the structure is immersed in water.

The invention comprises a semi-tubular ring of metal in the form of a mesh and suitably reinforced and braced and another semi-tubular and circumferentially sectional ring of wire mesh with the sections so joined that the second named semi-tube may be seated to encircle an inner automobile tube after being placed in the first named semi-tube. In this manner, the two semi-tubes constitute a complete cage of reinforced wire mesh permitting the introduction of air into the inner tube to the desired pressure, which may be as high as the pressure which the inner tube is called upon to withstand and which would prove destructive to the inner tube if it were not for the reinforcement.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:—

Fig. 1 is a plan view of a structure embodying the invention.

Fig. 2 is a display view of the outer section of the inner tube holder.

Fig. 3 is a cross section in a plane about intermediate of the thickness of the inner tube holder.

Referring to the drawing, there is shown a semi-tubular structure 1 of semi-circular cross section and composed of a skeleton frame 2, which may be formed of circular strands 3 of wire or the like soldered or otherwise connected together into the form of a cage and provided with a lining 4 of wire mesh of suitable gage. In order to impart rigidity to the cage 1, diametric spokes 5 are provided and these spokes may be joined together at their crossing point 6. The outer ends of the spokes are formed into yokes 7 forming seats for the cage 1.

The edge or marginal portions of the cage are formed at diametrically opposite points with seats 8 outturned to house similar diametric marginal portions 9 of another cage 10 which latter, instead of being a rigid cage like the cage 1, is made up of numerous sections 11 of segmental form and joined at their meeting edges by exterior hinges 12 and also provided with a lining 13 of metal mesh or fabric.

The cage 10 like the cage 1 is of reinforced construction and at opposite ends is provided with a latch 14 to hold the cage 10 together about the cage 1 with the marginal portions 9 seated in the marginal portions 8. At an appropriate point about the inner circumference of the cage 1 there is provided a passage 15 for the inner tube nipple of an inner tube housed in the structure. It is to be understood that both cages 1 and 10 may have considerably more reinforcement than in the showing of the drawings or the reinforcement may be of a heavier nature to withstand the internal pressure.

In order to use the device, the outer cage is removed by unfastening the latch 14 and stripping the cage 10 from the cage 1. The inner tire tube is then laid in the inner cage 1 with the filling nipple projecting through the opening 15. After this the outer cage is applied to the cage 1 and the latch 14 is closed, thus encircling the inner tube, so as to effectively resist expansion of the inner tube, which expansion occurs when the inner tube is blown up.

Ordinarily an inner tube if pumped up will stand but a few pounds pressure and then considerably enlarges even under such slight pressure, the tube frequently expanding at a weaker point to a large size. The amount of pressure which an inner tube will stand without harm is often too small to show the presence of pin-hole punctures, so that the usual water test is ineffective unless the punctures be relatively large and the inner tube will, therefore, frequently be considered as air-tight, only to prove to have a slow leak when placed in a tire casing and blown up to working pressure. This is due to the fact that such slow leaks are often not detectable under the low pressure to which the inner tube is subjected under test. With the invention, however, the inner tube may be blown up to the full pressure to which it is subjected when mounted on the wheel and under such circumstances, the presence of a leak, however small, is immediately made apparent and this without any danger whatever to the inner tube itself. In Fig. 3, the inner tube is indicated at 16.

What is claimed is:—

1. A testing device for the inner tubes of pneumatic tires, comprising a semi-tubular inner-tube holder forming a cage adapted to seat the inner tube, a semi-tubular sectional cover member therefor with the sections hinged together end to end, and means for holding the sectional cover member onto the first-named semi-tubular member to enclose an inner tube between the two members.

2. A testing device for the inner tubes of pneumatic tires, comprising a relatively rigid semi-tubular cage having walls of wire mesh, and a semi-tubular cover member therefor in the form of a cage composed of a series of segments hinged end to end and capable of being spread out, and also of wire mesh, and means for locking the second named cage in encircling relation to the first named cage.

3. A testing device for the inner tubes of pneumatic tires, comprising a relatively rigid semi-tubular cage having walls of wire mesh, and a semi-tubular cover member therefor in the form of a cage composed of a series of segments hinged end to end and capable of being spread out, and also of wire mesh, and means for locking the second named cage in encircling relation to the first named cage, the second named or rigid cage having expanded margins providing seats for the marginal portion of the second named cage.

4. A testing device for the inner tubes of pneumatic tires, comprising a semi-tubular cage and provided with wire-mesh walls and wire reinforcements, and a semi-tubular multi-sectional cover member in the form of a cage formed of segments hinged together end to end, and provided with wire mesh-walls and wire reinforcements and adapted to be locked about the first-named cage to confine an inner tube therein to resist internal pressure caused in the tube, whereby to show the presence of minute leaks.

5. A testing device for the inner tubes of pneumatic tires, comprising a semi-tubular cage of wire mesh with wire reinforcements and transverse braces, the cage being of rigid structure, and another semi-tubular cage of wire mesh and wire reinforcements and composed of segments hinged together end to end, means on one of the cages for centering the other cage thereon, and locking means for holding the cover cage on the first named cage.

In testimony, that I claim the foregoing as my own, I have hereto affixed my signature.

CLAUDE DAVIS GRADY.